Jan. 12, 1932.  C. E. PLOEGER  1,841,298
SHAFT SEAL FOR COMPRESSORS
Filed Sept. 7, 1929
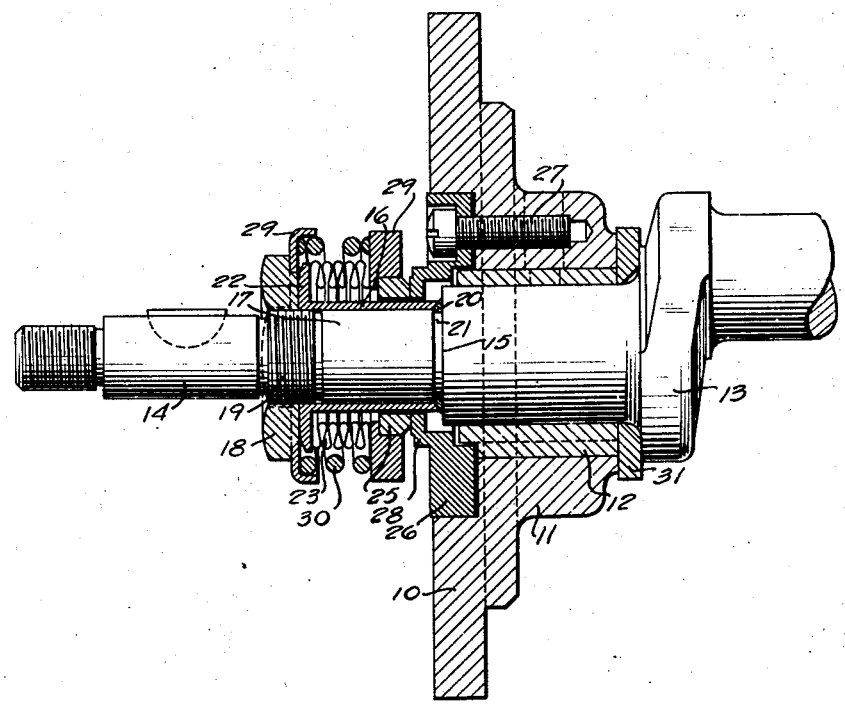
INVENTOR
Clyde Edward Ploeger
BY
William G. McKnight
his ATTORNEY Patented Jan. 12, 1932

1,841,298

UNITED STATES PATENT OFFICE

CLYDE EDWARD PLOEGER, OF EVANSVILLE, INDIANA, ASSIGNOR TO SERVEL, INC., OF NEW YORK, N. Y., A CORPORATION OF DELAWARE

SHAFT SEAL FOR COMPRESSORS

Application filed September 7, 1929. Serial No. 390,924.

My invention relates to an improvement in shaft seals for compressors and the like. In compressors, particularly those used in connection with domestic refrigerators, it is essential that a gas tight seal be maintained at the point where the crank shaft extends through the crank case in order to prevent the escape of the refrigerant or other working medium. Inasmuch as the crank shaft must be rotatable, the problem is one of obtaining a seal between members movable relative to each other.

More particularly, my invention relates to shaft seals of the type comprising a bellows member rotatable with a shaft. In this type of shaft seal it has been found that the stationary bearing member attached to the compressor crank case has become warped or distorted in cases where a distortion takes place in the part of the compressor casing to which the stationary bearing member is attached. A slight distortion may cause an objectionable leakage. It is among the objects of my invention to provide a new and improved type of seal bearing plate, the bearing surface of which will not be affected by a slight warping of the crank case or by other disturbing factors.

Further objects and advantages will be apparent from the following description when read in connection with the accompanying drawing forming part of this specification, which drawing is an elevational view, partially in cross-section, of a preferred embodiment of my invention.

Referring to the drawing, reference character 10 indicates a section of the wall of a compressor crank case or of any other piece of machinery in connection with which it is desired to employ a shaft seal. Wall 10 is enlarged, or thickened, as at 11, to receive and support a shaft bearing 12. Reference character 13 indicates generally a crank shaft, one end of which is rotatably supported in bearing 12. The end of the crank shaft extends through bearing 12 in wall 10 and is adapted at 14 to receive a pulley or gear wheel by means of which rotation may be imparted to the shaft.

A short distance outside of bearing 12 a shoulder 15 is formed on shaft 13. A spool 16, having an inside diameter substantially equal to the outside diameter of reduced section 17 of the shaft, is secured in place thereon by means of a nut 18 which engages threads 19 on the shaft. One end of spool 16 is forced against shoulder 15 and a gas tight joint is secured therebetween with the aid of packing 20 which is retained in a circumferential groove 21.

The outer end of spool 16 is provided with a flange 22 to which is hermetically sealed a circumferentially corrugated, longitudinally expansible and contractable member 23, hereinafter referred to as a bellows. The other end of bellows 23 is sealed to a ring 24 which supports a seal bearing ring 25. A seal bearing plate 26 is secured in a circular recess in wall 10 by means of a plurality of bolts 27.

Plate 26 comprises a main portion through which bolts 27 pass and which is clamped thereby against wall 10, and also an offset portion 28 on the outer face of which is formed a bearing surface. The neck of metal connecting the main portion of plate 26 with the offset portion 28 extends at right angles to the main and offset portions and is relatively thin and hence flexible and thus allows a slight distortion of the main part without this distortion being communicated to, or affecting in any way, the offset portion. In other words, the bearing surface of the offset portion 28 will remain true even though portion 26 attached to the compressor casing is slightly distorted.

A retaining collar 29 fits over a shoulder on nut 18 and is clamped between the nut and flange 22 on spool 16. One end of a helical spring 30 is retained by collar 29 while the other end of the spring bears against ring 24. A thrust bearing collar 31 is loosely mounted on shaft 13 adjacent to the inner end of bearing 12 and serves to take any end thrust in the shaft.

From the foregoing it will be seen that spool 16 rotates with shaft 13 and carries with it bellows 23, ring 24 and bearing ring 25. Bearing plate 26 is stationary and hence the seal is between the bearing surfaces of ring 25 and plate 26.

In operation, the interior of the crank case, of which wall 10 forms a part, is under a gas pressure which may vary from less than atmospheric to considerably more than atmospheric. The gas leaks past bearing 12 and into the interior of bellows 23 where approximately the same pressure is built up as that existing within the crank case. Inasmuch as the mean effective diameter of the bearing seal formed between bearing ring 25 and bearing plate 26 is less than the mean effective diameter of bellows 23, the gas pressure within the bellows will tend to expand the same and force ring 25 against plate 26, while the atmospheric pressure outside will have the opposite tendency. Hence, when the pressure within the bellows is less than atmospheric the bearing surfaces would be forced slightly apart and air would leak into the system if it were not for spring 30. This spring tends to force ring 25 against plate 26 and is strong enough to overcome atmospheric pressure. However, when the internal pressure is greater than atmospheric, which is ordinarily the case, the resultant effect of the two gas pressures is to expand the bellows without the aid of spring 30. Furthermore, this force tending to expand the bellows is of course proportional to the internal pressure and this is as it should be, for the greater the internal pressure, the greater the tendency for gas to leak between the surfaces of ring 25 and plate 26 and hence the tighter these surfaces should be forced together. On the other hand, when the internal pressure is not so great, it is undesirable that excess force should be applied, as this would cause undue wear of the surfaces.

By attaching bearing ring 25 to the bellows, it is not rigidly mounted but may accommodate itself so that the plane of its bearing surface will at all times lie in the plane of the bearing surface of plate 26. Thus, if the crank shaft is slightly bent or plate 26 is not in perfect alignment, the bearing surfaces will nevertheless lie in the same plane and the gas tight seal will not be impaired.

However, in bearing plates not constructed with an offset portion, the plate might not only be slightly out of alignment due to the improper assembly, but a slight warping of wall 10 would result in distorting the plate so that its bearing surface would not lie in a single plane but would become a warped surface. In this case it was impossible to obtain perfect contact between ring 25 and the plate, thus resulting in leakage.

The present bearing plate 26 is designed to overcome this difficulty by placing the bearing surface on the offset portion 28. While the main portion of the plate may be slightly distorted, the relatively thin neck of metal between it and the offset portion allows the latter to remain undistorted and its bearing surface remains in one plane. Hence, perfect contact between it and ring 25 is maintained and a shaft seal, gas tight at all times and under all conditions, is obtained.

While I have shown and described a more or less specific embodiment of my invention, it is to be understood that modifications thereof, such as would occur to one skilled in the art, fall within its scope which is to be limited only by the appended claims, viewed in the light of the prior art.

What I claim is:

In a shaft seal a perforated wall, a shaft extending through said wall, a bearing ring fixed to said shaft, and a bearing member fixed to said wall, said bearing member having an inwardly turned flange engaging said bearing ring, an outwardly turned flange for attachment to said wall and a substantially cylindrical web connecting said flanges, whereby distortion of the outwardly extending flange incident to its attachment to said wall is not transmitted to the inwardly turned flange.

In testimony whereof I have hereunto affixed my signature.

CLYDE EDWARD PLOEGER.